United States Patent
Anastasio et al.

(10) Patent No.: US 9,422,905 B2
(45) Date of Patent: Aug. 23, 2016

(54) SYSTEM FOR IN-FLIGHT RESTARTING OF A MULTI-SHAFT TURBOPROP ENGINE

(71) Applicant: ALENIA AERMACCHI S.P.A., Venegono Superiore (IT)

(72) Inventors: Vincenzo Anastasio, Venegono Superiore (IT); Fabrizio Cuomo, Venegono Superiore (IT)

(73) Assignee: ALENIA AERMACCHI S.P.A., Venegono Superiore (IT)

( * ) Notice: Subject to any disclaimer, the term of this patent is extended or adjusted under 35 U.S.C. 154(b) by 388 days.

(21) Appl. No.: 14/179,059

(22) Filed: Feb. 12, 2014

(65) Prior Publication Data

US 2014/0225378 A1 Aug. 14, 2014

(30) Foreign Application Priority Data

Feb. 13, 2013 (IT) .............. TO2013A0117

(51) Int. Cl.
*F02C 7/262* (2006.01)
*F02C 7/268* (2006.01)
(Continued)

(52) U.S. Cl.
CPC ............. *F02N 11/006* (2013.01); *F01D 15/10* (2013.01); *F02C 6/206* (2013.01); *F02C 7/262* (2013.01); *F02C 7/268* (2013.01); *F02N 11/04* (2013.01); *F02N 11/0866* (2013.01); *H02P 9/08* (2013.01); *F02N 2011/0888* (2013.01); *F02N 2011/0896* (2013.01); *H02P 2101/30* (2015.01)

(58) Field of Classification Search
CPC ........ F02C 7/262; F02C 7/268; F02C 6/206; F02N 11/006; F02N 11/0866; F02N 11/04; F02N 2011/0888; F02N 2011/0896; F01D 15/10; H02P 9/08; H02P 2101/30
See application file for complete search history.

(56) References Cited

U.S. PATENT DOCUMENTS 6,838,779 B1   1/2005   Kandil

FOREIGN PATENT DOCUMENTS

FR    1328712    5/1963
FR    2952130    5/2011

OTHER PUBLICATIONS

Italian Search Report for Corresponding Application IT TO 20130117.

*Primary Examiner* — Ted Kim
(74) *Attorney, Agent, or Firm* — Gottlieb, Rackman & Reisman, PC (57) ABSTRACT

A multi-shaft aeronautical turboprop engine in which a compressor draws in air coming from an air intake and drives, through an outer first shaft, a first stage of a turbine, which is provided with a second stage that drives a propeller by means of a second shaft mounted coaxially inside the first shaft. A starting system is provided that comprises: an asynchronous reversible electric machine connected by means of a transmission to the first shaft; a synchronous electric machine connected by means of a transmission to the second shaft; a reconfigurable electrical network that, in a phase of dynamic starting of the turboprop engine following its cutting out during flight, enables the transfer of energy produced by the synchronous electric machine, set in rotation by the propeller driven by dynamic effects, to the asynchronous electric machine, which is set in rotation at a lower speed than the asynchronous machine. The torque generated by the asynchronous machine is added to the torque originating from the blade compressor, which is impinged upon by the airflow coming from the air intake; the composition of these torques enables the first shaft to be set in rotation at a speed sufficient to achieve the restarting of the turboprop engine.

9 Claims, 7 Drawing Sheets

(51) Int. Cl.
*F02N 11/00* (2006.01)
*F01D 15/10* (2006.01)
*F02N 11/04* (2006.01)
*F02C 6/20* (2006.01)
*H02P 9/08* (2006.01)
*F02N 11/08* (2006.01)
*H02P 101/30* (2015.01)

SYSTEM FOR IN-FLIGHT RESTARTING OF A MULTI-SHAFT TURBOPROP ENGINE

TECHNICAL FIELD

The present invention relates to a system for the in-flight restarting of a multi-shaft aeronautical turboprop engine.

BACKGROUND OF THE INVENTION

Multi-shaft turboprop engines for aeronautical use are provided with a compressor that draws in air coming from an air intake and drives, through a first shaft, a first stage of a turbine that is set in rotation by exhaust gases coming from a plurality of burners. The turbine is provided with a second stage that drives the propeller by means of a second shaft, which is usually mounted coaxially inside the first shaft.

The starting of these multi-shaft turboprop engines is performed by means of an electric starter, in which an electric motor is connected to the first shaft to set the compressor and the first stage of the turbine in rotation. U.S. Pat. No. 4,799,354 illustrates an example of the above-mentioned type of starting system.

The energy necessary for this starting operation is taken from a plurality of batteries present on-board the aircraft or installed in an external unit positioned, on the runway near the aircraft.

Starting operations of the turboprop engine are easy on the runway, but can become extremely critical in flight, as the energy available on board can be limited in many operating conditions.

In addition, in such conditions, the rotational energy deriving from propeller being driven by the forward movement of the aircraft (known as wind-milling) cannot be transferred to the compressor and used to make it turn because the above indicated structure does not provide for any direct connection between propeller and compressor.

Rotation of the compressor with the turboprop engine switched off and by dynamic effects is therefore only possible by using air coming from the air intake; this action can be used to increase the probability of restarting the turboprop engine by means of The electric starter. Unfortunately, the dynamic action of air drawn in through the air intake is only effective for a limited range of aircraft altitudes/speeds.

The need is therefore felt to provide an aeronautical turboprop engine in which in-flight starting operations are improved with respect to those available in the known art.

SUMMARY OF THE INVENTION

The foregoing object is achieved by the present invention in so far as it relates to a multi-shaft aeronautical turboprop engine comprising a casing housing a compressor that draws in air coming from an air intake and drives, through a first shaft, a first stage of a turbine set in rotation by exhaust gases coming from a plurality of burners; the turbine being provided with a second stage that drives a propeller by means of a second shaft; said turboprop engine being characterized in that it comprises a starting system comprising: an asynchronous reversible electric machine connected by means of a transmission to the first shaft; a synchronous electric machine connected by means of a transmission to the second shaft; a reconfigurable electrical network that, in a phase of dynamic starting of the turboprop engine following its cutting out during flight, enables the transfer of energy produced by the synchronous electric machine, working as a generator under the thrust of the propeller driven by dynamic effects, to the asynchronous electric machine, which operates as motor and turns at a lower speed than the asynchronous machine; the torque generated by the asynchronous machine is added to the torque originating from the compressor, which is impinged upon by the airflow coming from the air intake; the composition of these torques enables the first shaft to be set in rotation at a speed sufficient to achieve the starting of the turboprop engine.

In this way, the capacity of autonomously restarting turboprop engines in wind-milling is improved by die electromagnetic coupling of the propeller shaft (which collects energy due to the forward movement of the aircraft) with the compressor that, in the case of wind-milling, is insufficiently energized by the airflow entering the air intake of the turboprop engine. The in-flight restarting capacity is thus rendered independent of aircraft's other on-board power sources. With the engine running, the architecture also enables having a very versatile and reliable electricity generation system, because it is based on rotating machines with well-established technologies. Each individual engine can supply power to the on-board electrical network with both generators.

BRIEF DESCRIPTION OF THE DRAWINGS

The invention will now be described with reference to the attached drawings, which represent a non-limitative preferred embodiment, where.

DETAILED DESCRIPTION OF THE INVENTION

Figure 1:
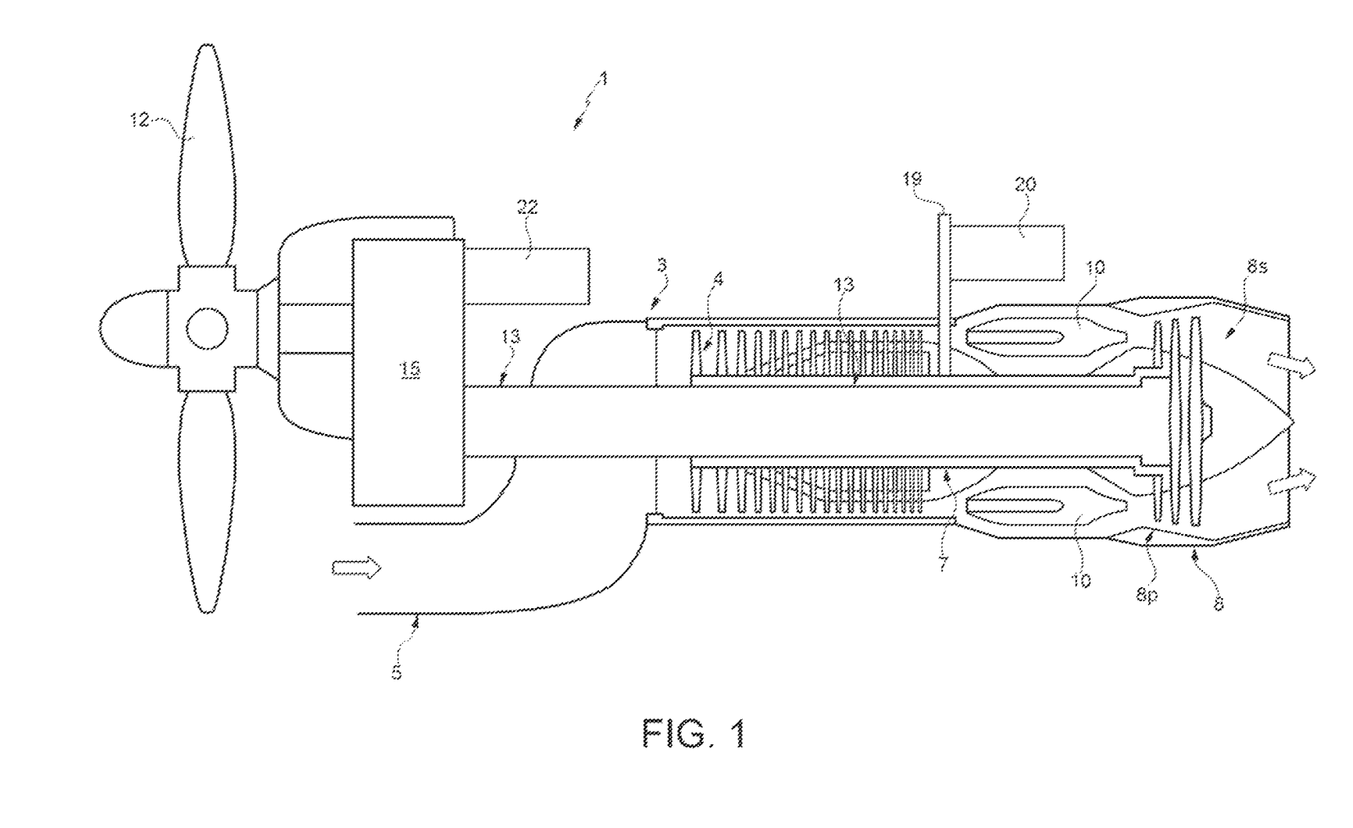
FIG. 1 schematically shows a multi-shaft aeronautical turboprop engine made according to the principles of the present invention.

FIG. 1 shows a multi-shaft aeronautical turboprop engine, indicated as a whole by reference numeral 1, equipped with a starting system made according to the present invention.

The structure of the multi-shaft turboprop engine 1 is of known type and will therefore only be described and illustrated schematically. In particular, the turboprop engine 1 comprises an elongated tubular casing 3, which houses a blade compressor 4 that draws in air coming from an air intake 5 connected to a front portion of the elongated tubular casing 3 and drives, through an outer first shaft 7, a first stage 8p of a turbine 8, which is set in rotation by exhaust gases coming from a plurality of burners 10.

The turbine 8 is provided with a second stage 8s that drives the propeller 12 by means of a second shaft 13 mounted coaxially inside the first shaft 7. In particular, a first rear end of the inner second shaft 13 carries the blades of the second stage 8s, while a first front end of the inner second shaft 13 is connected to an input of a reduction gear 15 having an output connected to the propeller 12.

The multi-shaft turboprop engine could also be equipped with a different number of shafts with respect to that shown, for example, three or four shafts.

The outer first shaft 7 connected by means of a (schematically shown) transmission 19 to a reversible electric machine 20 (i.e. capable of operating both as a generator and as a motor) that is implemented, according to the present invention, by means of an asynchronous electric machine.

As is known, an asynchronous electric machine is an alternating current electric machine in which the speed of rotation of the rotor is less than the speed of rotation of the magnetic field generated by the stator windings.

The rotation of the stator's magnetic field takes place at a speed $n_s$ strictly linked to the power supply frequency f, known as the synchronous speed. The rotor's speed of rotation $n_r$ is always less than the synchronous speed. This difference results in a magnetic field acting on the rotor that rotates at a relative speed of $n_s-n_r$, thus originating electromotive forces and therefore induced currents.

The link between synchronous speed, power supply frequency f and the number of polar pairs p is expressed by the relation (1):

$$n_s = 60 \frac{f}{p}$$

where $n_s$ is expressed in rpm (revolutions per minute) and f is expressed in Hertz.

Always according to the present invention, the inner second shaft 13 is connected by means of a transmission (for example, the reduction gear 15 could be used) to an electric generator 22 that is implemented, according to the present invention, by means of a synchronous electric machine.

As is known, a synchronous electric machine is an alternating current electric machine in which the electrical frequency $f_v$ of the generated voltage is strictly linked to the speed of rotation of the rotor, according to the relation:

$$f = \frac{n_s p}{60}$$

where $n_s$ is expressed in rpm (revolutions per minute.) and p is the number of polar pairs for each phase on the stator.

The synchronous electric machine 22 and the asynchronous electric machine 20 are connected, always according to the present invention, by a reconfigurable electrical network 25 (shown in detail in FIG. 2) that, in a phase of dynamic starting of the turboprop engine 1 following its cutting out during flight, enables the transfer of alternating voltage produced by the synchronous electric machine 22, working as a generator under the thrust of the propeller driven by the dynamic effects, to the asynchronous electric machine 20, which functions as a motor and rotates at a lower speed than the asynchronous machine (according to that set forth in the foregoing description).

The torque generated by the asynchronous machine 20 (working as a generator) is added to the torque originating from the blade compressor, which is impinged upon by the airflow coming from the air intake 5. The composition of these torques enables the first shaft 7 to be set in rotation at a speed sufficient to achieve the restarting of the turboprop engine.

Conveniently, during the above-described phase of dynamic starting, at least one of the polar pairs of the asynchronous electric machine 20 is disconnected in order to increase its speed of rotation, as expressed by the above-indicated relation (1).

Figure 2:
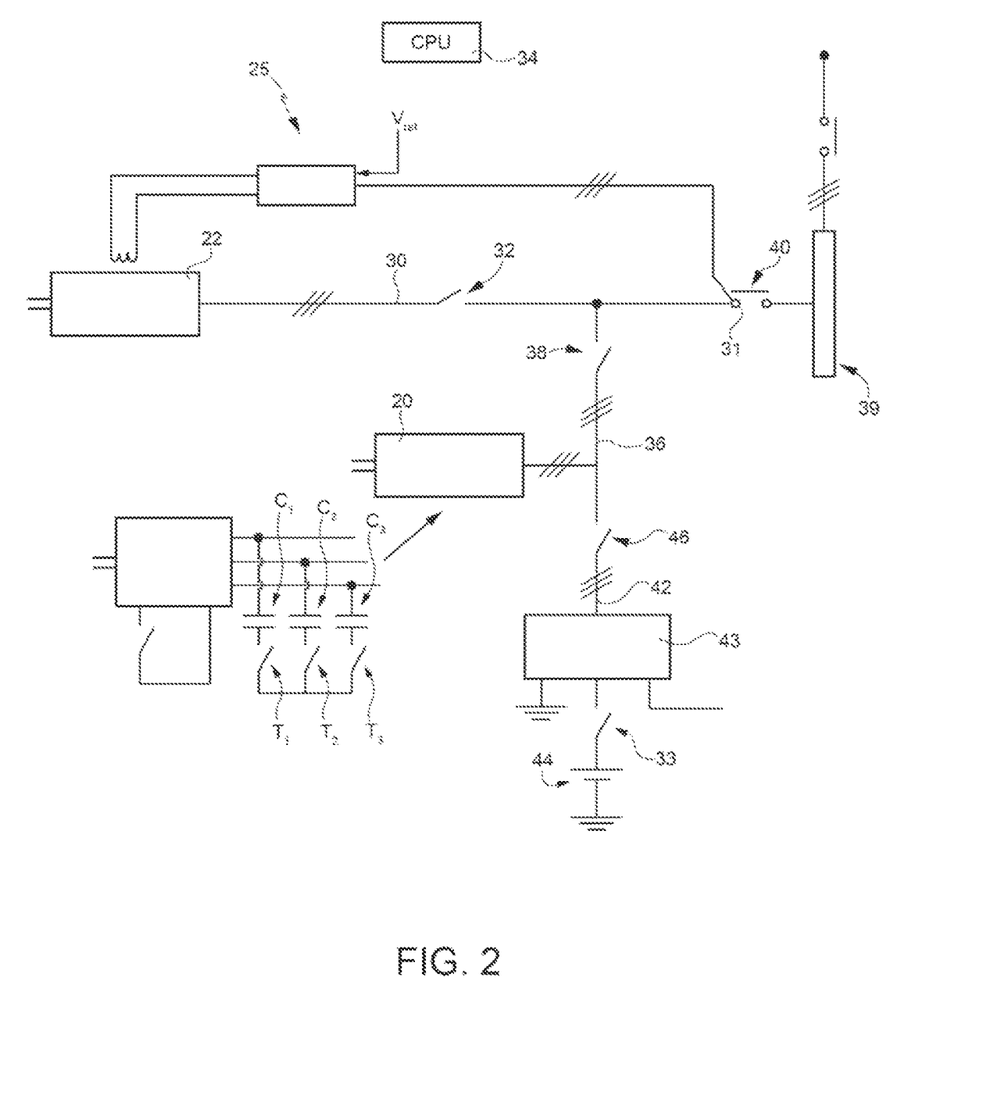
FIG. 2 shows a wiring diagram for the control of the starting operations of the multi-shaft turboprop engine in FIG. 1.

FIG. 2 shows the reconfigurable electrical network 25 as a whole.

This reconfigurable electrical network 25 comprises a first electric power line 30 that runs between the synchronous electric machine 22 and a reference node (POR) 31; a first switch 32, the switching of which is controlled by an electronic control unit 34, is placed along the first electric power line 30.

The reconfigurable electrical network 25 comprises a second electric power line 36 that runs between the reference node 31 and the asynchronous electric machine 20; a second switch 38, the switching of which is also controlled by the electronic control unit 34, is placed along the second electric power line 36.

The reference node 31 can be connected to the on-board electric power line 39 of an aircraft (not shown) through a circuit breaker 40.

A third electric power line 42 runs between the asynchronous electric machine 20 and an inverter 43, which is powered by a plurality of batteries 44 that can be housed on the aircraft or be outside the aircraft; a third switch 46, the switching of which is also controlled by the electronic control unit 34, is placed along the third electric power line 42.

The operations of the electronic control unit 34 for the purposes of implementing the various phases of starting and running the turbocharger are described below.

Figure 3A:
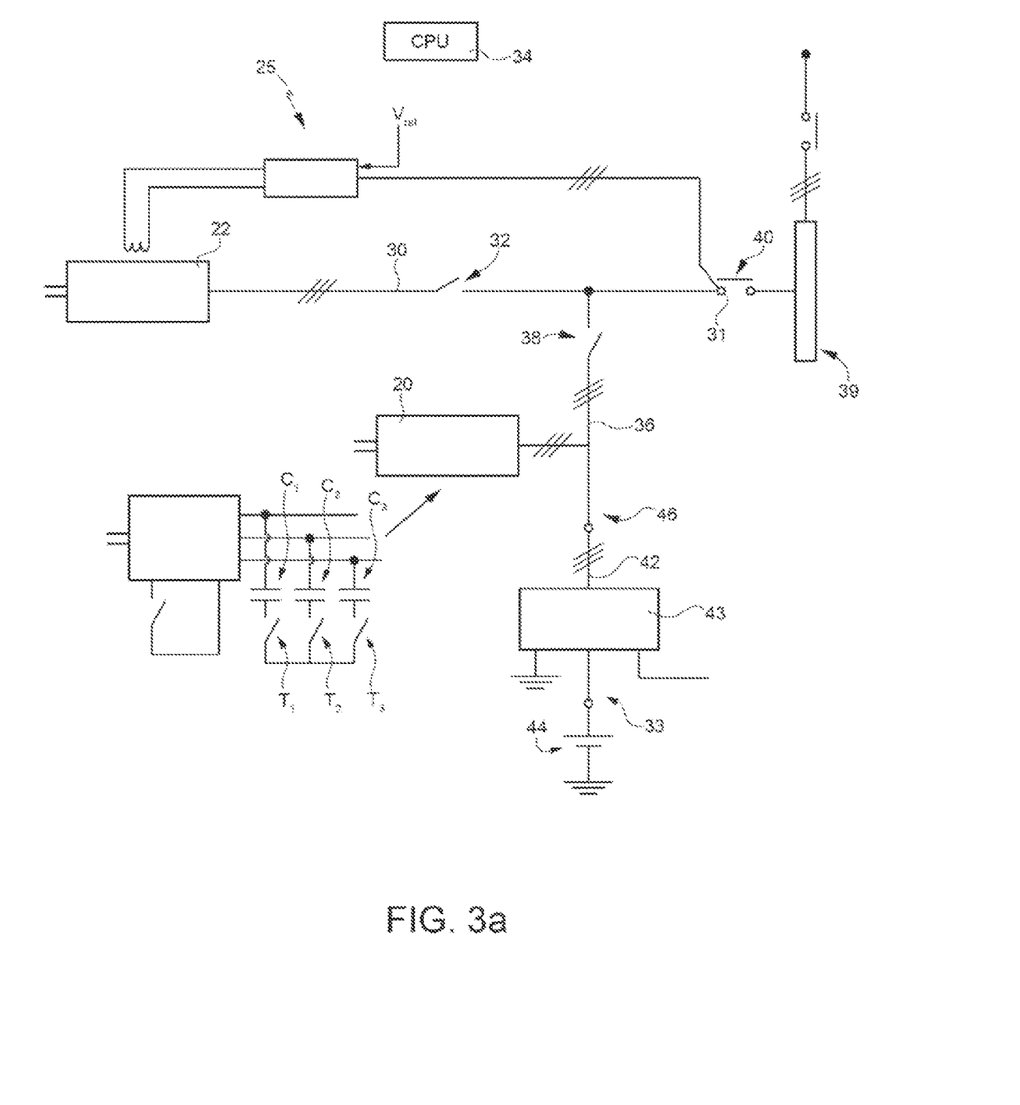
FIGS. 3a, 3b, 3c, 3d and 3e show different operational phases of the turboprop engine according to the present invention.

Static Starting Phase (FIG. 3a)

The electronic control unit 34 takes control of the starting sequence by closing switch 46 and a switch 33 that enables connecting the batteries 44 to the inverter 43. Switches 32 and 38 are open.

The direct voltage supplied by the batteries 44 is transformed by the inverter 43 into an alternating voltage, controlled in amplitude and frequency, which is supplied to the asynchronous electric machine 20, which functions as a motor, generating torque that drives the first shaft 7 in rotation at a speed sufficient to enable the starting of the multi-shaft turboprop engine 1. These operations are performed with the aircraft standing on the runway. Power can also be supplied to the inverter 43 by other AC or DC sources outside the aircraft.

Figure 3B:
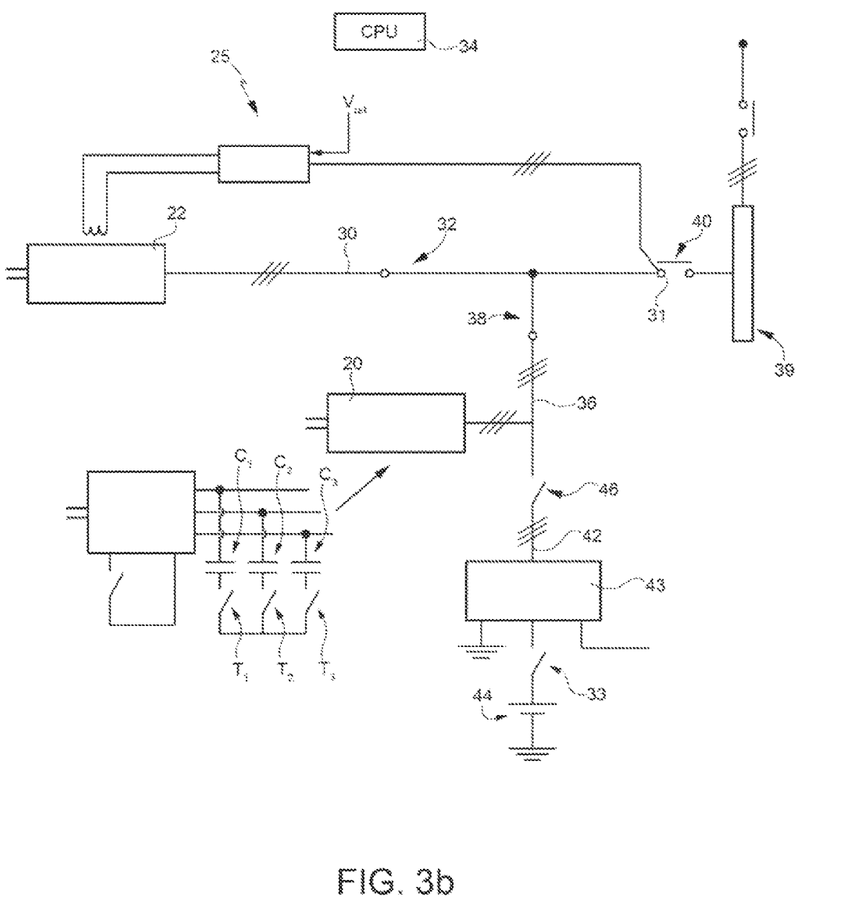

Dual Generation Phase (FIG. 3b)

The electronic control unit 34 controls the closing of the first and second switches 32 and 38, and the opening of the third switch 46. The inverter 43 is thus disconnected from the configurable electric power line 25.

The turboprop engine (when running) sets the asynchronous generator 20 and the synchronous generator 22 in rotation; however, the speed of rotation $\omega_s$ of the synchronous generator 22 is less than de speed of rotation $\omega_{as}$ of the asynchronous generator because the multi-shaft compressor 4, together with its shaft 7, normally rotates at a higher speed than shaft 13.

It is assumed that the reduction ratios of reduction gear 15 (to the synchronous generator) and reduction gear 19 (to the asynchronous generator) are the same.

Due to this speed difference ($w_{as} > w_s$), the asynchronous generator 20 works at a higher speed than the synchronism set by the synchronous generator 22 and the asynchronous generator can deliver current to line 38.

During the dual generation phase, the voltage present on the reference node 31 is measured and compared to a reference value $V_{ref}$ to generate an error signal that is used (with the usual closed-loop control techniques) for driving excitation of the synchronous generator 22 in order to render the voltage on the node 31 as far as possible equal to the reference value. In effect, the voltage at the set point 31 is the vector sum of the voltages generated by the synchronous generator $\vec{v}_s$ and the asynchronous generator $\vec{v}_{as}$. As the load on the busbar 39 changes and with the contactor 40 closed and controlled by the electronic control unit 34, the GCU, which controls excitation of the synchronous generator 22, adjusts the excitation of the generator 22 so that $\vec{v}_s + \vec{v}_{as}$ is equal to the reference voltage value.

In this way, the asynchronous generator 20 can handle possible overloads of the on-board electric power line 39, for the same negative slip between alternator and asynchronous generator, by acting solely on the excitation adjustment of the synchronous generator 22. For this functionality, it is assumed that the synchronous generator 22 and the asynchronous generator 20 have the same number of poles stator poles and that the speed of rotation of the asynchronous generator is higher than that of the synchronous one as explained above.

Figure 3C:
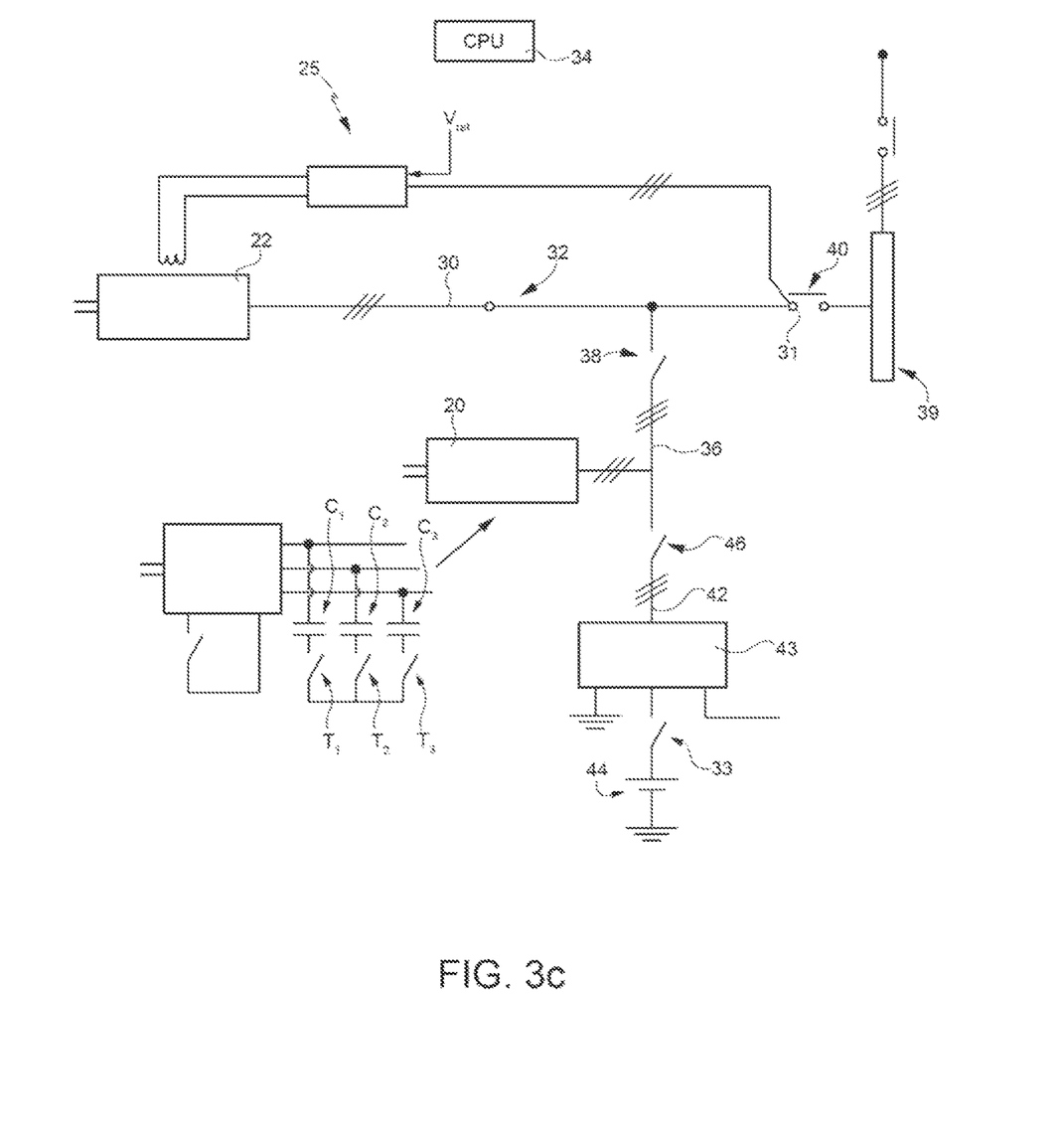

Generation Phase with Just the Synchronous Generator (FIG. 3c)

The electronic control unit 34 controls the closing of the first switch 32 and the opening of the second and third switches 38 and 46. The asynchronous electric machine 20 and the inverter 43 are thus disconnected from the configurable electric power line 25. The turboprop engine 1 is running.

During the generation phase with just the synchronous generator 22, the voltage present on the reference node 31 is measured and compared to a reference value to generate an error signal that is used (with the usual closed-loop control techniques) for driving excitation of the synchronous generator in order to render the voltage on the node 31 as far as possible equal to the reference value. With the closure of the contactor 40 by the electronic control unit 34, the synchronous generator 22 supplies the loads connected to the busbar 39.

Figure 3D:
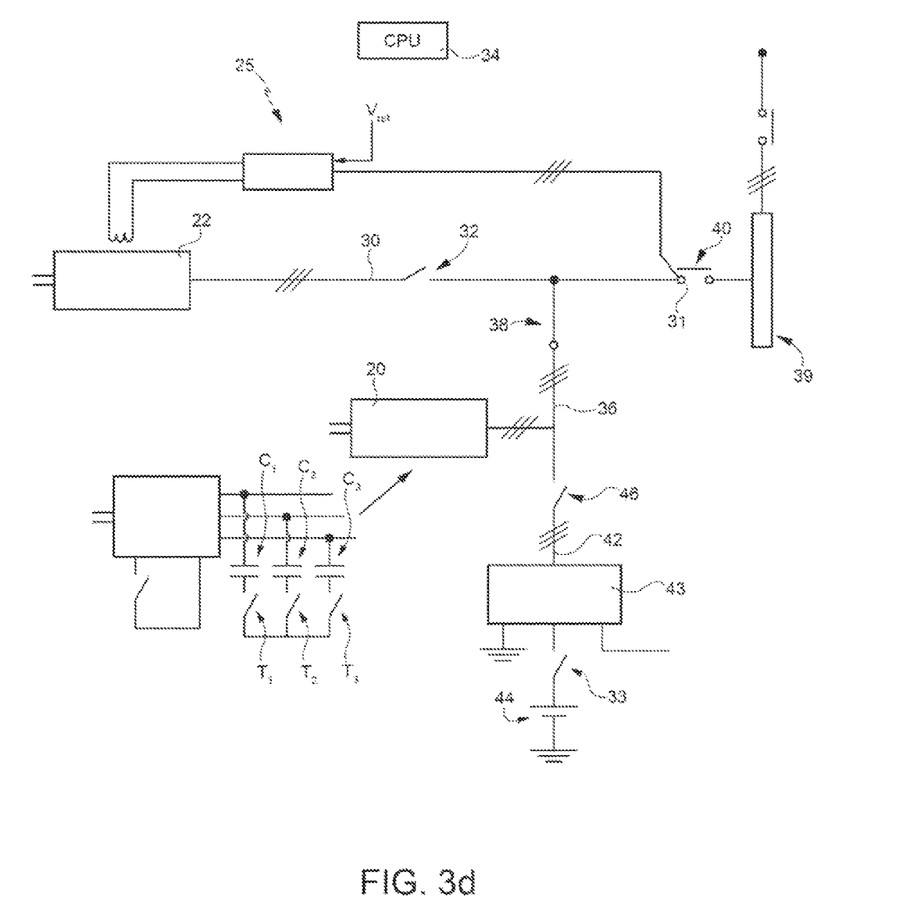

Generation Phase with Just the Asynchronous Generator (FIG. 3d)

The electronic control unit 34 controls the closing of the second switch 38 and the opening of the first and third switches 32 and 46. The synchronous electric machine 22 and the inverter 43 are thus disconnected from the configurable electric power line 25. The turboprop engine 1 is running. In order to ensure excitation of the stator phases of the asynchronous electric machine 20, a local energy source (battery of capacitors) is used or power supplied by the on-board network powered by the generator of the second turboprop engine (assuming a twin-engined aircraft), which enables the asynchronous generator to deliver current the electric power line 36.

FIG. 2 schematically shows a battery of capacitors C1, C2 and C3 that can be connected to respective phases of the asynchronous machine 20 by switches T1, T2 and T3.

The above-described functioning with just the asynchronous generator should be considered a degraded mode of operation as it assumes that the synchronous generator 22 is not available.

Figure 3E:
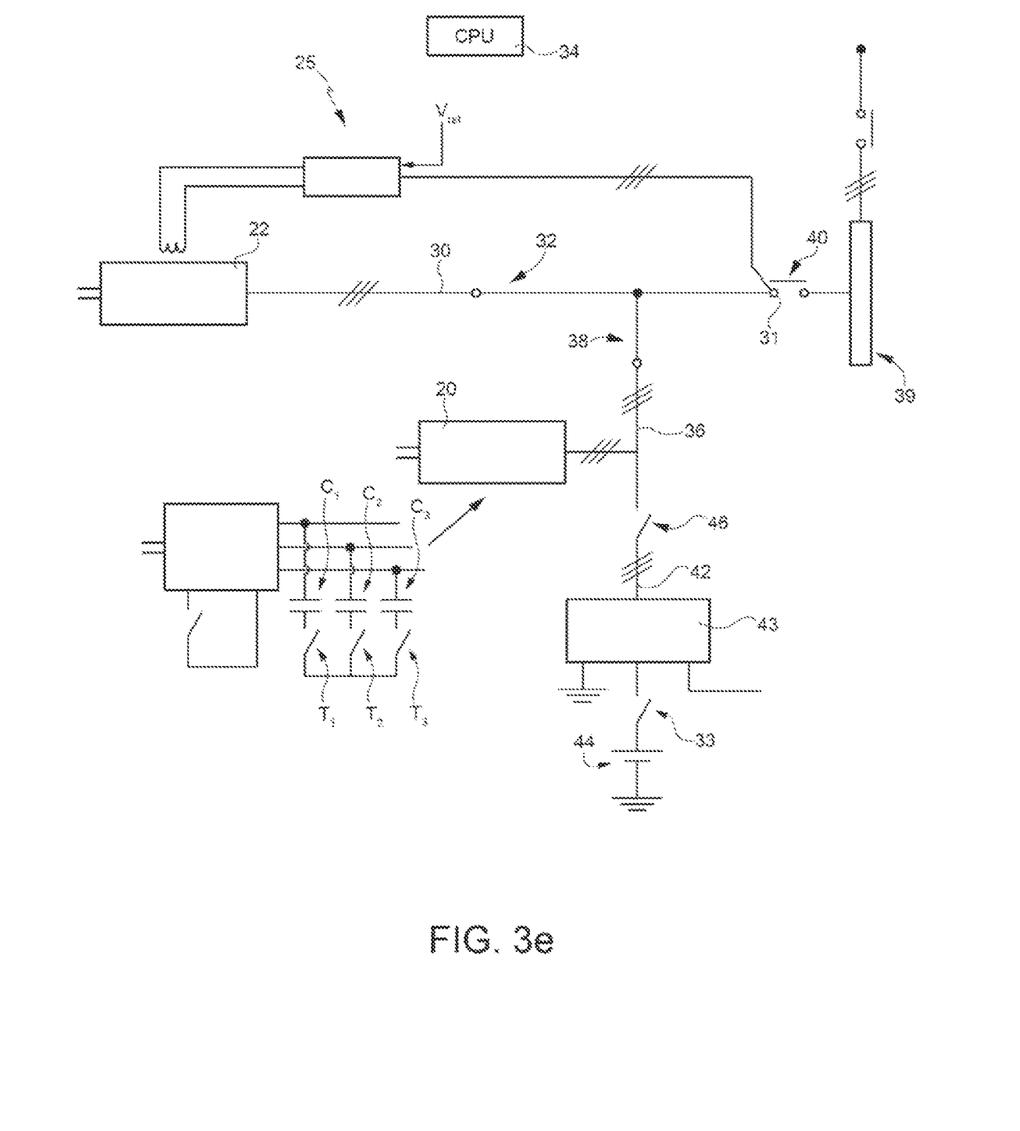

Dynamic Starting or Wind-Milling Starting Phase (FIG. 3e)

The electronic control unit 34 controls the closing of the first and second switches 32 and 38, and the opening of the third switch 46. The inverter 43 is thus disconnected from the configurable electric power line 25 while the synchronous electric machine 22 and the asynchronous electric machine 20 are connected to the reference node 31.

In this way, the electricity generated by the synchronous electric machine 22 (working as a generator) driven by the propeller that rotates due to dynamic effects is transferred through electric power lines 30 and 36 to the asynchronous electric machine 20, which functions as a motor and contributes to setting the first shaft 7 in rotation to enable restarting the turboprop engine 1.

As explained above, the asynchronous electric machine 20 rotates at a lower speed than the synchronous machine 22, for the previously explained reasons, and the torque generated by the asynchronous machine 20 is added to the torque originating from the blade compressor 4, which is impinged upon by the airflow coming from the air intake 5. The composition of these torques enables the first shaft 7 to be set in rotation at a speed sufficient to achieve the restarting of the turboprop engine. In the case where the speed of rotation of the asynchronous machine 20 is insufficient for starting the engine, the possibility is provided for disconnecting a pair of poles on its armature to increase the speed of rotation.

In other words, in the case of the engine cutting out during flight, it can be restarted by harnessing the energy collected by the propeller and converted into electrical energy by the synchronous generator connected thereto.

The invention claimed is:

1. A multi-shaft aeronautical turboprop engine comprising a casing (3) housing a compressor (4) that draws in air coming from an air intake (5) and drives, through a first shaft (7), a first stage (8p) of a turbine (8) set in rotation by exhaust gases coming from a plurality of burners (10);

the turbine (8) being provided with a secondary stage (8s) that drives a propeller (12) by means of a second shaft (13);

said turboprop engine being characterized in that it includes a starting system, comprising:

an asynchronous reversible electric machine (20) connected by means of a transmission (19) to the first shaft (7);

a synchronous electric machine (22) connected by means of a transmission (15) to the second shaft (13);

a reconfigurable electrical network (25) that, in a phase of dynamic starting of the turboprop engine (1) following its cutting out during flight, enables the transfer of energy produced by the synchronous electric machine (22), working as a generator under the thrust of the propeller driven by dynamic effects, to the asynchronous electric machine (20), which operates as motor and turns at a lower speed than the asynchronous machine; the torque generated by the asynchronous machine (20) is added to the torque originating from the compressor (4), which is impinged upon by the airflow coming from the air intake (5); the composition of said torques enables the first shaft (7) to be set in rotation at a speed sufficient to achieve the starting of the turboprop engine.

2. The turboprop engine according to claim 1, wherein control means are provided that are able to disconnect at least one of the polar pairs of the asynchronous electric machine (20) in order to increase its speed of rotation during said phase of dynamic starting.

3. The turboprop engine according to claim 1, wherein said reconfigurable electrical network (25) comprises:
- a first electric power line (30) that extends between the synchronous electric machine (22) and a reference node (POR; 31); a first switch (32), the switching of which is controlled by an electronic control unit (34), is provided along the first electric power line (30));
- a second electric power line (36) that extends between the reference node (31) and the asynchronous electric machine (20); a second switch (38), the switching of which is controlled by the electronic control unit (34), is provided along the second electric power line (36); and
- a third electric power line (42) that extends between the synchronous electric machine (20) and an inverter (43) that can be powered by a DC voltage source (44); a third switch (46), the switching of which is also controlled by the electronic control unit (34), is provided along the third electric power line (42);

said reference node (31) can be connected to an electric power line (39) on board an aircraft through a circuit breaker (40).

4. The turboprop engine according to claim 3, wherein said electronic control unit (34) is configured to perform a phase of static starting (FIG. 3a) of said turboprop engine, in which the control unit (34) assumes control of the starting sequence by closing the third switch (46) in such a way that the DC voltage supplied by the batteries (44) is transformed by the inverter (43) into an AC voltage, controlled in amplitude and frequency, supplied to the asynchronous electric machine (20) that functions as a motor, generating torque for driving the first shaft (7) in rotation at a speed such as to enable starting of the turboprop engine (1).

5. The turboprop engine according to claim 3, wherein said electronic control unit (34) is configured to perform a phase of dual generation (FIG. 3b), in which the electronic control unit (34) controls the closing of the first and second switches (32 and 38) and the opening of the third switch (46) in order to disconnect the inverter (43) from the configurable electric power line (25);

said turboprop engine sets in rotation the asynchronous electric machine (20) and the synchronous electric machine (22), which both behave as generators; the speed of rotation $\omega_s$ of the synchronous electric machine (22) being lower than the speed of rotation $\omega_{as}$ of the asynchronous machine (20) such that the asynchronous electric machine (20) can deliver current to the second electric power line (36).

6. The turboprop engine according to claim 5, wherein a closed-loop control system is provided in which a comparison is made between the voltage measured on the reference node (31) and a reference value to generate an error signal that is used for driving excitation of the synchronous electric machine (22) in order to render the voltage on the node (31) as far as possible equal to the reference value.

7. The turboprop engine according to claim 3, wherein said electronic control unit (34) is configured to perform a phase of generation with just the synchronous generator (FIG. 3c), in which the electronic control unit (34) controls the closing of the first switch (32) and the opening of the second and third switches (36 and 46) in order to disconnect the asynchronous electric machine (20) and the inverter (43) from the configurable electric power line (25); said turboprop engine sets in rotation the synchronous electric machine (22), which behaves as a generator.

8. The turboprop engine according to claim 3, wherein said electronic control unit (34) is configured to perform a phase of generation with just the asynchronous generator (FIG. 3d), in which the electronic control unit (34) controls the closing of the second switch (38) and the opening of the first and third switches (32 and 46) in order to disconnect the synchronous electric machine (22) and the inverter (43) from the configurable electric power line (25);

the asynchronous electric machine (20) being connected in such a way that its phases receive energy coming from a local energy source, or from the on-board network supplied by the generator of a further turboprop engine in the case of a twin-engined aircraft, in order to ensure excitation of the phases of the asynchronous electric machine (20); said turboprop engine sets in rotation the asynchronous electric machine (22), which behaves as generator.

9. The turboprop engine according to claim 3, wherein said electronic control unit (34) is configured to perform said phase of dynamic starting (FIG. 3e), in which the electronic control unit (34) controls the closing of the first and second switches (32; 38) and the opening of she third switch (46) in order to disconnect the inverter (43) from the configurable electric power line (25) and set the synchronous electric machine (22) in communication with the asynchronous electric machine (20) through the reference node (31);

the electrical energy generated by the synchronous electric machine (22), which functions as a generator driven by the propeller that spins due to dynamic effects, is transferred through the first and second electric power lines (30 and 36) to the asynchronous electric machine (20), which functions as a motor and contributes to setting the first shaft (7) in rotation to enable in-flight starting of the turboprop engine (1).

* * * * *